April 14, 1959  C. E. DARNELL  2,881,541
LAND LEVELER

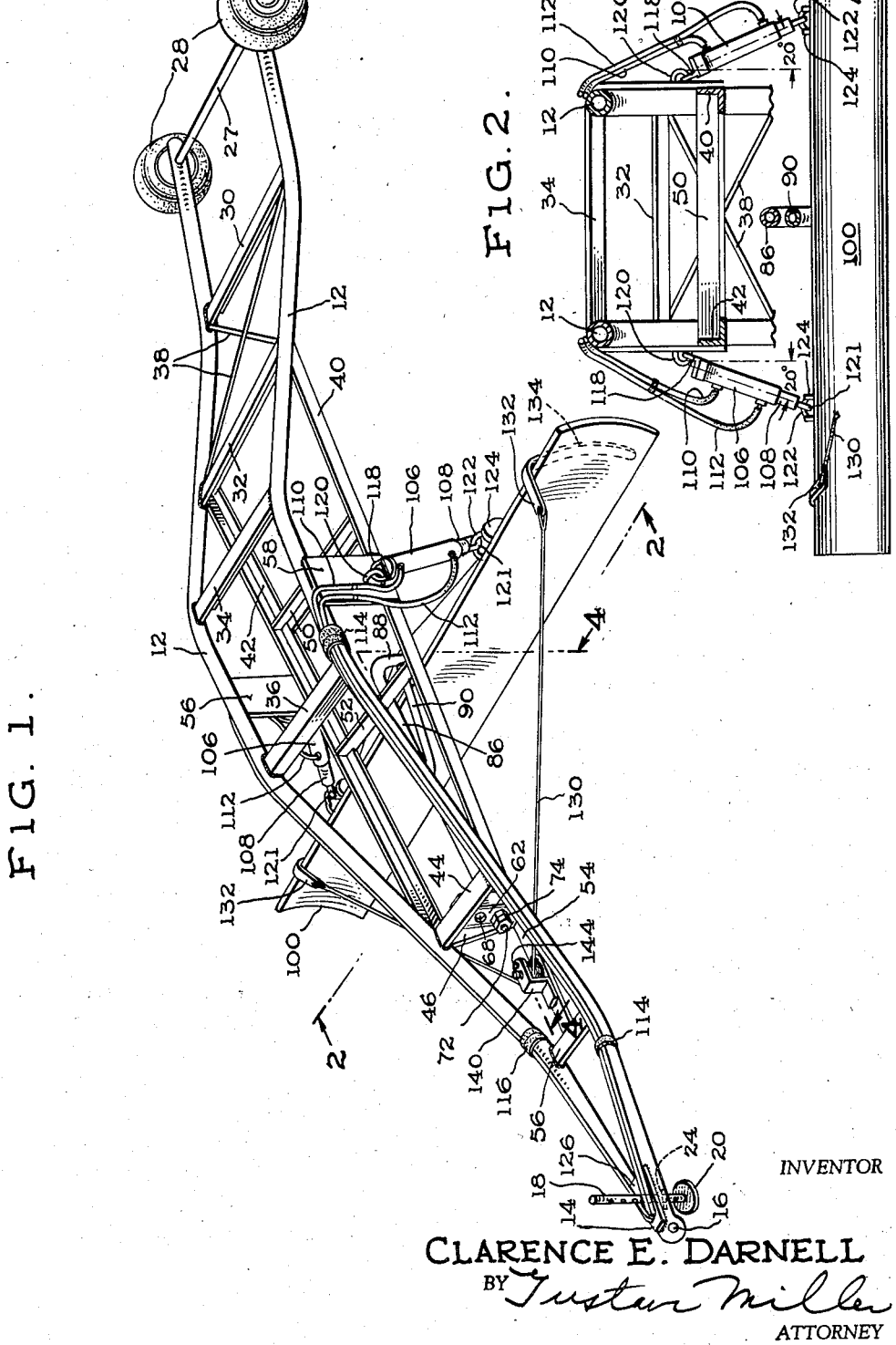

Filed March 18, 1957  2 Sheets-Sheet 2

INVENTOR
CLARENCE E. DARNELL
BY Tristan Miller
ATTORNEY

United States Patent Office 2,881,541
Patented Apr. 14, 1959

2,881,541

LAND LEVELER

Clarence E. Darnell, Curundu, Canal Zone

Application March 18, 1957, Serial No. 646,904

13 Claims. (Cl. 37—169)

This invention relates to an improved tractor-drawn and tractor-controlled land leveler and which provides a comparatively inexpensive low-cost yet all purpose land leveler arranged to be hitched to and drawn by a tractor and to have the angle and the height of the blade adjustably controlled from the conventional hydraulic system of a farm tractor.

A further object of this invention is to provide an improved land leveler which is comparatively inexpensive as compared to the conventional land leveler, and thus the land leveler of this invention is particularly adapted for ownership and operation by a farmer with a comparatively small farm rather than a large farm of excessive acreage as is necessary to support the ownership of a conventional leveler.

Still a further object of this invention is to provide a land leveler which is supported by wheels at its rear end and attached to and supported by the tractor at its forward end in operation, yet is of such construction that while inexpensive, it is still substantial and rigid in its framework, yet has a blade which may be readily set and maintained at an angle to its longitudinal, and which blade is so supported and so connected to the conventional pressure control means of a farm tractor so that the blade as a whole may be raised or lowered vertically, or may have either end thereof raised or lowered relative to the other end thereof from the farm tractor while in operation, thus enabling the operator to change the height or angle of either end of the blade as may be necessary according to the contour of the land that is being leveled or otherwise operated upon.

Still a further object of this invention is to provide a land leveler which is provided with an arched frame consisting of a pair of arched frame members, of light yet rigid construction, secured at their forward end in a V-apex and supported at their rearward end by wheel and axle means, which framework is provided at its intermediate arched portions with means for adjustably and controllably supporting a leveling or scraping blade, the height and transverse angle of which is readily controllable from the farm tractor while in operation.

Yet a further object of this invention is to provide a land leveler having an arched framework with a leveling blade supported thereunder by controllable hydraulic cylinder and ram means with the hydraulic cylinder and ram means extending at such an outward and forward angle that the blade is firmly held in the adjusted position.

Still a further object of this invention is to provide, in a leveling machine, a blade of special design having a pair of vertically spaced reinforcing bars secured along its back and providing means for pivotally mounting the blade on a universally pivoted drawbar, the blade also having adjacent its end vertically extending ribs which are then extended forwardly over the top of the blades and provide brackets to which are attached the opposite ends of a cable whose central portion is snubbed about and adjustably secured sheave so that the transverse angle of the blade may be adjusted and secured.

Still a further object of this invention is to provide a drawbar for supporting the blade, so that the blade may be pivotally mounted on the drawbar, and the drawbar itself may be universally secured or coupled in either of two positions to a securing means very rigidly secured and braced to the framework of the leveler so that it will have ample strength without excessive weight.

Still a further object of this invention is to provide a double acting type of hydraulic cylinder and ram, controllable from the farm tractor for controllably raising or lowering the leveling blade or for adjusting the angle of the blade to the horizontal.

Still a further object of this invention is to provide a land leveler framework of substantial rigid construction yet of light weight and low cost.

With the above and related objects in view, this invention consists in the details of construction and combination of parts as will be more fully understood from the following description, when read in conjunction with the accompanying drawing, in which:

Fig. 1 is a perspective view of the land leveler of this invention.

Fig. 2 is a sectional view on line 2—2 of Fig. 1.

Figure 3:
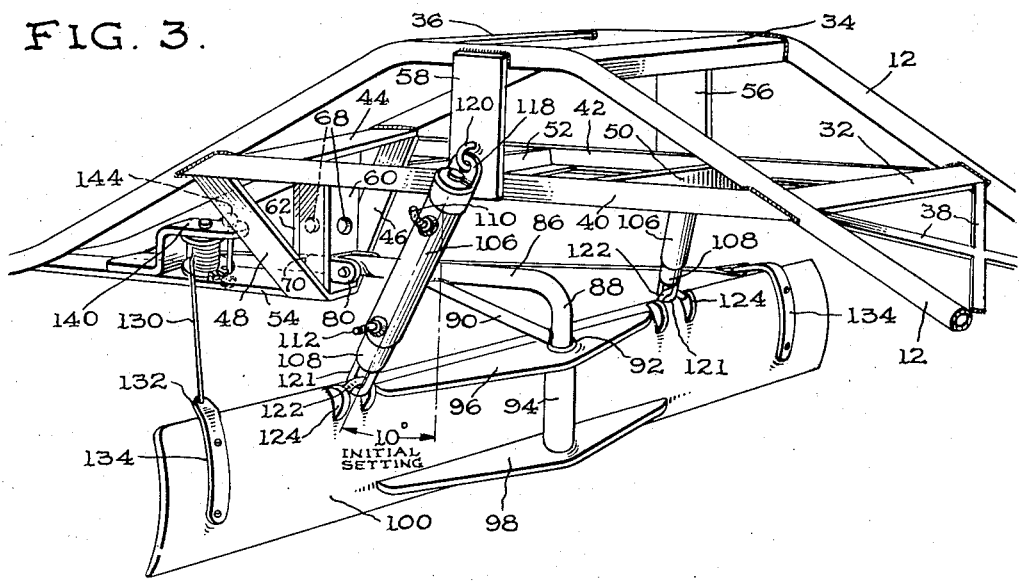
Fig. 3 is a perspective fragmentary view looking forward from the rear of the leveling blade.
Figure 5:
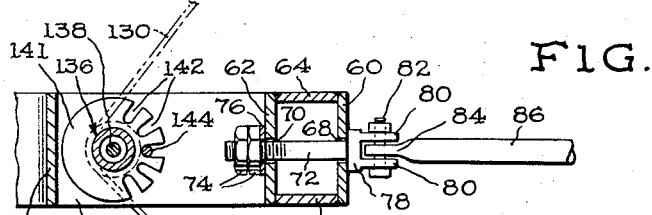
Fig. 5 is a sectional view on line 5—5 of Fig. 4.
Figure 4:
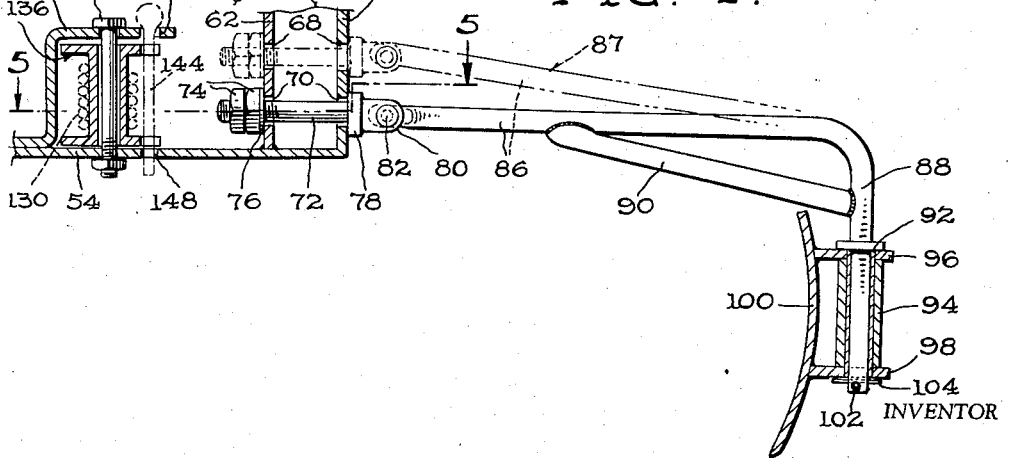
Fig. 4 is a sectional view on line 4—4 of Fig. 1.

There is shown at 10 the land leveler of this invention having a light weight comparatively inexpensive rigid arched and braced framework consisting of a pair of arched tubular frame members 12 joined in a V-apex 14 at their forward end, at which it is provided with an eye 16 to which may be secured a hitch bar from a farm tractor.

Also mounted in the V-apex 14 of the frame members 12 is an adjustable jack stand 18 having a supporting foot 20 and provided with a plurality of transverse holes 22 through which a pin 24 may be inserted either below the jack supporting plate 26 through which it extends for supporting the front end of the framework when secured to a tractor, or the pin 24 may be inserted above the supporting plate 26 for carrying the jack stand while the leveler 10 is attached to the hitch bar of a farm tractor.

Extending through the rear ends of the frame members 12 is a rear axle 27 on which are journaled supporting wheels 28. As shown in Fig. 2 and Fig. 3, the frame members 12 are of light weight tubular construction for strength and low cost. Extending transversely between the tubular frame members 12 are a plurality of transverse brace members 30, 32, 34, and 36. As will be observed, the transverse brace member 30 is spaced from the ends of the tubular frame members 12 and of the axle 27, and diagonal brace members 38 forming an X with each other extend diagonally from the juncture of the transverse brace member 30 with the tubular frame members to the juncture of the transverse brace member 32 with the tubular frame members 12, thus providing an extremely rigid brace means. It will be also noted that the X brace members 38 and their transverse brace members 30 and 32 are secured at the rear portion of the arch of the tubular frame members 12. Extending longitudinally of the tubular brace members 12 are straight longitudinal chord brace members 40 and 42, which as shown are of angle iron construction just as are the previously mentioned brace members, but which if desired may be of tubular construction similar to that of the frame members 12.

The longitudinal brace members 40 and 42 extend across the bottom of the arch of the frame members 12, being secured thereto at the juncture of the transverse brace member 32 therewith at the rear end, and at the forward end, are secured to the tubular frame members 12 at the juncture of a top leg 44 of a triangular depending bracket member having wishbone or angular sides 46 and 48.

To increase and improve the rigidity of the framework, the longitudinal brace members 40 and 42 are connected by transverse brace members 50 and 52, shown as angle iron members but likewise capable of being tubular in construction.

The bottom ends of the wishbone or depending side angle members 46 and 48 are secured to the T-stem 54 of a T-plate whose T-head 56 extends and provides a further brace between the tubular members 12 somewhat adjacent their V-apex 14.

Vertically extending between the top of the arch of the frame member 12 and thus between transverse brace members 34 and 36, and secured at their bottom ends to the longitudinal brace members 40 and 42 are plate members 58 and 60. The construction thus described provides a very rigid yet a light-weight and inexpensive framework for the leveler 10 of this invention and provides means for the operating mechanism to be mounted, adjusted and controlled thereon.

Secured between the upper triangular leg 44 and the T-stem 54 at the bottom of the angular sides 46 and 48 are a pair of vertically extending parallel spaced apart bracket plates 60 and 62 boxed in by reinforcing vertically extending side plates 64 and 66 to provide ample strength thereto. Extending through the bracket plates 60 and 62 and vertically spaced apart are pairs of apertures 68 and 70 through which is journalled a bolt 72 threaded at one end to receive double nuts 74 and a thrust washer 76 at the forward end, the rearward end of the bolt 72 having a head 78 from which extends a pair of spaced apart eyes 80 for receiving a coupling pin 82 therethrough and through an apertured end 84 of a drawbar 86.

As will be observed, the drawbar 86 is L-shaped, the long arm of the L being the arm that has the apertured end 84, and the short arm of the L at 88 secured to the long arm by a reinforcing brace 90, extends vertically through a bushing 92, replaceable when necessary, in a sleeve 94 extending vertically between a pair of spaced apart horizontal reinforcing bars 96 and 98 welded or otherwise firmly secured on the back of a leveling blade 100, the leveling blade 100 being forwardly concave as customary.

The bolt 72 may be removed from its holes 70 and replaced in the upper aligned holes 68 to thereby change the supporting position of the L-shaped drawbar 86 to the position shown at 87, correspondingly changing the vertical angle or vertical plane of the blade 100 so that it will be more of a cutting blade rather than a leveling or scraping blade.

Extending through the bottom of the vertical short arm of the L-shaped drawbar 86 is a cotter pin 102 supporting a thrust washer 104 between it and the bottom reinforcing bar 98.

This cotter pin 102 and thrust washer 104 serve to cause the drawbar 86 to remain with its short leg 88 in position in the sleeve 94, but do not in reality carry the weight of the blade 100. The weight of the blade 100 is carried by a pair of hydraulic cylinders 106 each having a hydraulic piston 108 adjustably and controllably positioned by means of the hydraulic pressure lines 110 and 112, the lines 110 and 112 being secured by brackets 114 and 116 along the tubular frame members 12 to the V apex 14 where they are coupled in a conventional manner to a double hydraulic control box on the farm tractor for operation so that pressure can be provided in and withdrawn from either of the pressure lines 110 and 112 to thus extend or retract the hydraulic pistons within the hydraulic cylinders 106.

Each hydraulic cylinder 106 is provided with an upstanding ear 118 secured or linked by a U-bolt 120 to either plate 56 or 58, while the hydraulic pistons 108 are similarly provided with ears 121 linked or secured by U-bolts 122 to brackets 124 supported in appropriate position on the back of the blade 100.

The U-bolts 122 and brackets 124 on the blade 100 are so located relative to the U-bolts 120 on the plates 56 and 58 that the axis of the hydraulic cylinders 106 and hydraulic pistons 108 extend downwardly and outwardly 20° from the vertical as shown in Fig. 2, and likewise extend 10° forwardly of the vertical as shown in Fig. 3 when in the initial setting with the blade in raised position and extending at right angles to the longitudinal of the framework.

As shown, in the initial setting, the blade 100 is at zero degrees to the transverse, but this angle to the transverse is adjusted and controlled by means of a cable 130 whose ends are secured to forwardly extending brackets 132 of ribs 134 extending vertically down the back of the blades 100 adjacent each end thereof. At its mid point, the cable 130 is snubbed several times around a sheave 136 journalled on a sheave pin 138 extending between a sheave bracket 140 and the T-stem 54 of the T-plate.

The cable 130 is snubbed tightly about the sheave 136, and the sheave flanges 141 are notched as at 142 to receive a sheave locking pin 144 for extending therethrough and through an aperture 146 in the sheave bracket 140 and a similar aperture 148 in the T-stem 54. When the sheave locking pin 144 is removed, the blade 100 may be changed to a slight angle to the transverse as described, and then locked in the adjusted angular position by replacing the sheave locking pin 144 through the appropriate notches 142 and the apertures 146 and 148.

In operation, if used as a leveling blade, the drawbar 86 will be left in the position shown, but if used as more or less of a cutting blade it will be shifted to the position shown at 87.

The transverse angle of the blade 112 may be adjusted as just described by removing the sheave blocking pin 144 and replacing it when the angle has been properly adjusted. The leveler is hitched to a farm tractor, and its pressure lines coupled to the double hydraulic control box on the farm tractor, whereupon by appropriate manipulation, the blade 100 may be lowered or raised or its angle at either end may be adjusted to the horizontal as desired. This adjustment of the height or horizontal angle of the blade can be controlled as desired while the tractor is in operation and in motion thus enabling the operator to adjust the blade according to the contour of the land. There is thus provided a land leveler of comparatively low cost and weight and great strength which may be purchased and owned by a farmer of moderate means enabling him to level the land as needed close up to the corners of the field as desired as well as over the area of the field.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A land leveler comprising a longitudinally arched framework having longitudinally extending chord brace means reinforcing the arched portions thereof, said arched framework having wheel carrying means at one end and hitch attaching means at the other end, a leveler blade, a drawbar to which said leveler blade is mounted for pivotal movement around a substantially vertical axis, universal coupling means securing said drawbar to said arched frame, cable means secured at its ends adjacent opposite ends of said leveler blade and means for lockably snubbing said cable intermediate its ends to said framework for securing said leveling blade at a set angle on said drawbar, and hydraulic pressure controllable means adjustably supporting said leveling blade at spaced apart points intermediate its center and both ends from opposite sides and beneath of said arched framework, said hydraulic means extending at an angle outwardly and forwardly of the vertical from said framework to said leveling blade, said leveling blade having a pair of horizontally extending spaced apart reinforcing bars extending rearwardly therefrom, a vertical sleeve extending through and supported by said reinforcing bars at the center thereof, said drawbar being L-shaped, the long leg of said L-shaped drawbar being secured to said universal coupling securing means, the short leg of said L-shaped bar being secured to said leveling blade through said vertical sleeve.

2. The land leveler of claim 1, said outward angle of said hydraulic means being approximately 20° and said forward angle being approximately 10°.

3. The land leveler of claim 1, said arched framework comprising a pair of longitudinally extending tubular frame members converging into a V-apex at its hitch attaching end, and angle iron brace means extending between and secured to said longitudinally extending frame members.

4. The land leveler of claim 1, said snubbing means comprising a bracket secured to and depending from said arched framework, a sheave rotatably mounted on said bracket, said cable being snubbed about said sheave, and removable and replaceable pin means for locking said sheave against rotation.

5. The land leveler of claim 1, said hydraulic pressure controllable means comprising hydraulic cylinder means and cooperating hydraulic piston means, one of said latter hydraulic means being linked to said blade, the other of said latter hydraulic means being linked to said framework, and independently controllable pressure supply lines to said hydraulic means on opposite sides of said framework for independently controlling opposite ends of said leveling blade.

6. The land leveler of claim 1, said leveling blade having a vertically extending rib secured to the back thereof adjacent each end thereof and a bracket integrally extending forwardly therefrom over the top of said blade, said rib bracket providing means whereby said cable is secured to said blade.

7. A land leveler comprising a pair of centrally arched longitudinally extending frame members joined in a V apex at their forward ends and spaced apart at their rear ends, tractor hitch cooperating means provided at said forward V apex, wheel and axle means provided at said spaced apart rear ends, reinforcing brace means extending laterally between spaced apart portions of said frame members, brace means extending longitudinally of each arched frame member reinforcing the arched portions thereof, a reinforcing plate member extending vertically between said arched portion of each frame member and its longitudinally extending brace means, a triangular bracket having one side joined between said frame members at the forward juncture of said longitudinally extending brace members, and having its other two sides extending down and inward, a T-plate having its T-stem extending forwardly from a juncture between said two downwardly extending triangular sides and having its T-head joined to said two frame members, a leveling blade, a draw bar to which said blade is pivotally secured universally pivotal means securing said drawbar to said triangular bracket, a sheave mounted on said T-plate, a cable snubbed about said sheave and having its ends secured to said blade adjacent the opposite ends thereof, means for adjustably securing said sheave against rotation, hydraulic cylinder and ram means secured at one end to each said vertically extending plate and to said blade intermediate its pivotal support and the cable attachment thereto for vertically adjusting and angling said blade about said drawbar universal pivotal means, each said hydraulic cylinder and ram means being initially set, in raised position, at an angle outwardly and forwardly of the vertical, and hydraulic pressure supply conduits to each said hydraulic cylinder and ram means for controllably providing pressure control thereto.

8. The land leveler of claim 7, and means for securing said universally pivotal securing means at a second and higher position to said triangular bracket to thereby change the plane of said leveling blade.

9. The land leveler of claim 7, the outward angle of said hydraulic cylinder and ram means being approximately 20°, and the forward angle being approximately 10°.

10. A land leveler comprising a pair of arched tubular frame members joined in a V apex at their forward ends and spaced apart at their rear ends, tractor hitch cooperating means provided at said forward V apex, a jack stand adjustably secured at said forward V apex, wheel and axle means provided at said spaced apart rear ends, transverse and diagonal reinforcing angle iron brace means extending laterally between spaced apart portions of said frame members, angle iron brace means extending longitudinally of each arched frame member reinforcing the arched portions thereof, a reinforcing plate member extending vertically between said arched portion of each frame member and its longitudinally extending brace means, one of said transverse brace means being spaced from said rear ends, another of said transverse brace means being located at the rear juncture of said longitudinal brace means and its frame member, said diagonal brace means extending in an X between the juncture of said latter two mentioned transverse brace means and said frame members, another two of said transverse brace means being spaced apart on opposite sides of said vertically extending plate members, a triangular bracket having one side joined between said frame members at the forward juncture of said longitudinally extending brace members, and having its other two sides extending down and inward, a T-plate having its T-stem extending forwardly from a juncture between said two downwardly extending triangular side and having its T-head joined to said two frame members, a leveling blade, a draw bar to which said blade is pivotally secured, universally pivotal means securing said draw bar to said triangular bracket, a sheave mounted on said T-plate, a cable snubbed about said sheave and having its ends secured to said blade adjacent the opposite ends thereof, means for adjustably securing said sheave against rotation, hydraulic cylinder and ram means secured at one end to each said vertically extending plate and to said blade intermediate is pivotal support and the cable attachment thereto for vertically adjusting and angling said blade about said drawbar universal pivotal means, each said hydraulic cylinder and ram means being initially set, in raised position, at approximately 20° outwardly and 10° forwardly of the vertical, and hydraulic pressure supply conduits to each said hydraulic cylinder and ram means for controllably providing pressure control thereto, and means for securing said universally pivotal securing means at a second and higher position to said triangular bracket to thereby change the plane of said leveling blade, a pair of horizontally extending vertically spaced apart parallel reinforcing bars secured on the rear of said blade, a vertical sleeve extending through and supported by said reinforcing blades at the center thereof, said drawbar being L-shaped, the long leg of said L-shaped drawbar being secured to said universally pivotal securing means, the short leg of said L-shaped bar being secured to said leveling blade through said vertical sleeve.

11. The land leveler of claim 10, said leveling blade also having a vertically extending rib secured to the back thereof adjacent each end thereof between said end and said reinforcing bars, and a bracket integrally extending forwardly from each said rib over the top of said blade and providing means whereby said cable is secured to said blade.

12. A land leveler comprising a pair of arched tubular frame members joined in a V apex at their forward ends and spaced apart at their rear ends, tractor hitch cooperating means provided at said forward V apex, a jack stand adjustably secured at said forward V apex, wheel and axle means provided at said spaced apart rear ends, transverse and diagonal reinforcing angle iron brace means extending laterally between spaced apart portions of said frame members, angle iron brace means extending longitudinally of each arched frame member reinforcing the arched portions thereof, a reinforcing plate member extending vertically between said arched portion of each frame member and its longitudinally extending brace means, one of said transverse brace means being spaced from said rear ends, another of said transverse brace means being located at the rear juncture of said longitudinal brace means and its frame member, said diagonal brace means extending in an X between the juncture of said latter two mentioned transverse brace means and said frame members, another two of said transverse brace means being spaced apart on opposite sides of said vertically extending plate members, a triangular bracket having one side joined between said frame members at the forward juncture of said longitudinally extending brace members, and having its other two sides extending down and inward, a T-plate having its T-stem extending forwardly from a juncture between said two downwardly extending triangular sides and having its T-head joined to said two frame members, a leveling blade, a drawbar to which said blade is pivotally secured, universally pivotal means securing said drawbar to said triangular bracket, a sheave mounted on said T-plate, a cable snubbed about said sheave and having its ends secured to said blade adjacent the opposite ends thereof, means for adjustably securing said sheave against rotation, hydraulic cylinder and ram means secured at one end to each said vertically extending plate and to said blade intermediate its pivotal support and the cable attachment thereto for vertically adjusting and angling said blade about said drawbar universal pivotal means, each said hydraulic cylinder and ram means being initially set, in raised position, at approximately 20° outwardly and 10° forwardly of the vertical, and hydraulic pressure supply conduits to each said hydraulic cylinder and ram means for controllably providing pressure control thereto.

13. A land leveler comprising a pair of arched tubular frame members joined in a V apex at their forward ends and spaced apart at their rear ends, tractor hitch cooperating means provided at said forward V apex, wheel and axle means provided at said spaced apart rear ends, transverse and diagonal reinforcing angle iron brace means extending laterally between spaced apart portions of said frame members, angle iron brace means extending longitudinally of each arched frame member reinforcing the arched portions thereof, a reinforcing plate member extending vertically between said arched portion of each frame member and its longitudinally extending brace means, one of said transverse brace means being spaced from said rear ends, another of said transverse brace means being located at the rear juncture of said longitudinal brace means and its frame member, said diagonal brace means extending in an X between the juncture of said latter two mentioned transverse brace means and said frame members, another two of said transverse brace means being spaced apart on opposite sides of said vertically extending plate members, a triangular bracket having one side joined between said frame members at the forward juncture of said longitudinally extending brace members, and having its other two sides extending down and inward, a T-plate having its T-stem extending forwardly from a juncture between said two downwardly extending triangular sides and having its T-head joined to said two frame members, a leveling blade, a drawbar to which said blade is pivotally secured, universally pivotal means securing said drawbar to said triangular bracket, a sheave mounted on said T-plate, a cable snubbed about said sheave and having its ends secured to said blade adjacent the opposite ends thereof, means for adjustably securing said sheave against rotation, hydraulic cylinder and ram means secured at one end to each said vertically extending plate and to said blade intermediate its pivotal support and the cable attachment thereto for vertically adjusting and angling said blade about said drawbar universal pivotal means, each said hydraulic cylinder and ram means being initially set, in raised position, at approximately 20° outwardly and 10° forwardly of the vertical, and hydraulic pressure supply conduits to each said hydraulic cylinder and ram means for controllably providing pressure control thereto, and means for securing said universally pivotal securing means at a second and higher position to said triangular bracket to thereby change the plane of said leveling blade.

References Cited in the file of this patent
UNITED STATES PATENTS

| | | |
|---|---|---|
| 377,082 | Martin | Jan. 31, 1888 |
| 410,249 | Lomont | Sept. 3, 1889 |
| 1,759,647 | Kincannon | May 20, 1930 |
| 2,090,776 | Arndt | Aug. 24, 1937 |
| 2,586,977 | Moody | Feb. 26, 1952 |
| 2,635,888 | Bailiff | Apr. 21, 1953 |
| 2,672,702 | Goddard | Mar. 23, 1954 |